(12) United States Patent
Sipola (10) Patent No.: US 7,649,858 B2
(45) Date of Patent: Jan. 19, 2010

(54) METHOD AND APPARATUS FOR PROVIDING RADIO BEARER MULTIPLEXING WITHIN SEGMENTATION PROTOCOL

(75) Inventor: Jussi Sipola, Oulu (FI)

(73) Assignee: Nokia Corporation, Espoo (FI)

( * ) Notice: Subject to any disclaimer, the term of this patent is extended or adjusted under 35 U.S.C. 154(b) by 1021 days.

(21) Appl. No.: 10/471,487

(22) PCT Filed: Mar. 14, 2001

(86) PCT No.: PCT/IB01/00378

§ 371 (c)(1), (2), (4) Date: Jan. 23, 2004

(87) PCT Pub. No.: WO02/073894

PCT Pub. Date: Sep. 19, 2002

(65) Prior Publication Data

US 2004/0114565 A1 Jun. 17, 2004

(51) Int. Cl.
*H04W 4/00* (2006.01)
*H04B 7/212* (2006.01)
*H04J 3/08* (2006.01)
*H04J 3/24* (2006.01)

(52) U.S. Cl. .................. 370/314; 370/349; 370/321; 370/326

(58) Field of Classification Search .............. 370/349, 370/395, 473, 311, 314, 321, 326
See application file for complete search history.

(56) References Cited

U.S. PATENT DOCUMENTS 5,802,051 A * 9/1998 Petersen et al. ......... 370/395.42
6,141,784 A * 10/2000 Davis et al. ................. 714/748
2002/0064140 A1* 5/2002 Numminen ................. 370/311

FOREIGN PATENT DOCUMENTS

EP 0915592 A1 5/1999
EP 1133109 A1 9/2001

* cited by examiner

*Primary Examiner*—Vincent P Harper
*Assistant Examiner*—Wesley L Kim
(74) *Attorney, Agent, or Firm*—Harrington & Smith, PC (57) ABSTRACT

A method is disclosed for multiplexing a plurality of data flows onto a radio channel, as is a wireless communication system that operates in accordance with the method. The method includes steps of (a) segmenting data packets of a first data flow into radio blocks; b) in response to a required transmission of data packets of a second data flow, signaling in a first field a change in data flows; (c) signaling in a second field an identity of the second data flow; and (d) segmenting data packets of the second data flow into radio blocks and transmitting the radio blocks of the second data flow. The method further includes steps of (e) changing back to transmitting the first data flow; and (f) continuing the transmission of an incompletely transmitted packet of the first data flow.

22 Claims, 5 Drawing Sheets

METHOD AND APPARATUS FOR PROVIDING RADIO BEARER MULTIPLEXING WITHIN SEGMENTATION PROTOCOL

FIELD OF THE INVENTION

This invention relates generally to radio communication systems and methods and, more particularly, relates to mobile radio digital communication systems that provide a packet data transmission and reception capability.

BACKGROUND OF THE INVENTION

Modern wireless telecommunications systems are evolving to provide high speed packet data services for users of mobile equipment. One example is an ability to provide internet access to a user of mobile equipment. A wireless system that is rapidly evolving in this direction is a Time Division, Multiple Access (TDMA) system known as the Global System for Mobile Communication (GSM), in particular enhanced versions of GSM known as GSM+, GPRS (General Packet Radio Services) and EGPRS (Enhanced General Packet Radio Service).

In EGPRS, as currently specified, different packet data flows of single mobile station can be multiplexed to a single radio channel. Such data flows consist of packets of different sizes, and the radio channel can contain radio blocks of different sizes. In a Radio Link Control (RLC) protocol of the EGPRS the data flows correspond to radio bearers and packets correspond to Packet Data Convergence Protocol (PDCP) blocks, and the radio channel and radio blocks correspond to a Temporary Block Flow (TBF) and RLC blocks, respectively. A TBF is established to permit the transmission of packet data (PDCP blocks).

Figure 1:
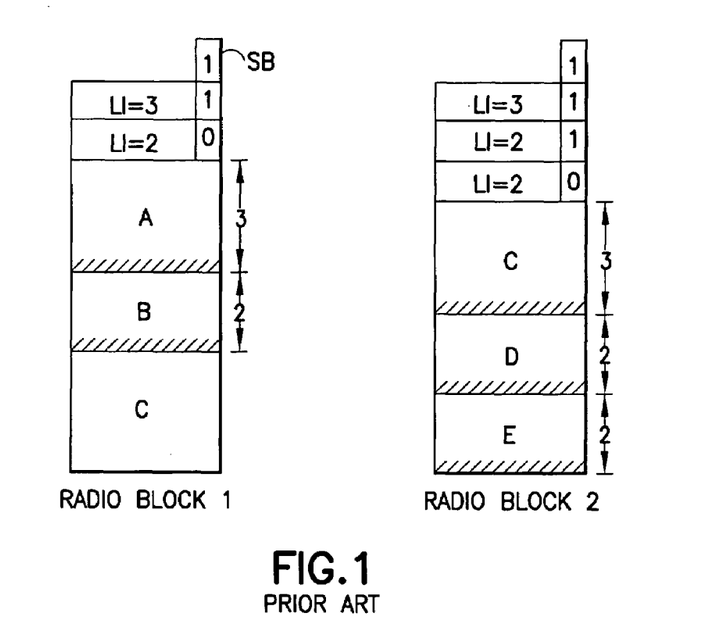
FIG. 1 is diagram of a conventional segmentation protocol that uses length indicators and bits for indicating a presence or absence of extension octets.

FIG. 1 is useful for explaining a segmentation protocol that is currently specified for EGPRS. Two blocks are shown for carrying a total of five packets. At the beginning of a block a single bit (indicated as SB) indicates whether an extension octet is present. In the example of FIG. 1, both blocks have this bit set to one for indicating that an extension octet is present in each block. The extension octet contains a Length Indicator (LI) field and a bit indicating whether another extension octet is present. In this manner each block can contain a variable number of extension octets, and therefore a variable number of Length Indicators. The last extension octet in each of the blocks has this bit set to zero, indicating that no further extension octet is present. The presence of the Length Indicator fields reduces the actual data carrying capability of the block accordingly.

The radio blocks can contain data segments from one or more data packets. In the example shown in FIG. 1 the first block (block 1) contains three segments which contain packets A and B and the beginning of packet C. The Length Indicators indicate the length of those segments that carry the last octet of a packet (in this case, packets A and B). Since no Length Indicator is provided for packet C, packet C is interpreted as continuing in the next block (block 2). In block 2 there are three Length Indicators present, as well as the remaining part of packet C, and all of packets D and E. Since the length of the third segment is specified by a length indicator, packet E does not continue to the next block. Since there is no remaining space in block 2 it does not include any further segments, no packet continues from block 2 to the next block.

Figure 2:
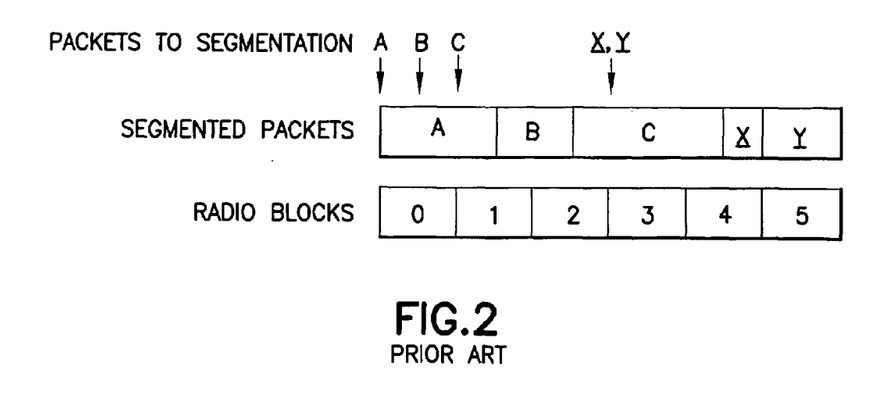
FIG. 2 is a diagram that is useful for explaining a conventional multiplexing above segmentation approach to multiplex packets from different flows within a single TBF.

In a first approach that was used in EGPRS Release 1999 (R99), which can be referred to as a multiplexing above segmentation technique, packets from different flows are multiplexed into a single TBF. In this method, and referring to the example shown in FIG. 2, two radio bearers or flows are being multiplexed. The first flow contains packets A, B and C, and the second flow contains higher priority packets X and Y. A significant drawback to this technique is that once the transmission of a packet has begun (e.g., packet C), the entire packet must be transmitted, even if new, higher priority packets arrive that are significantly shorter than the packet currently being transmitted.

Figure 3:
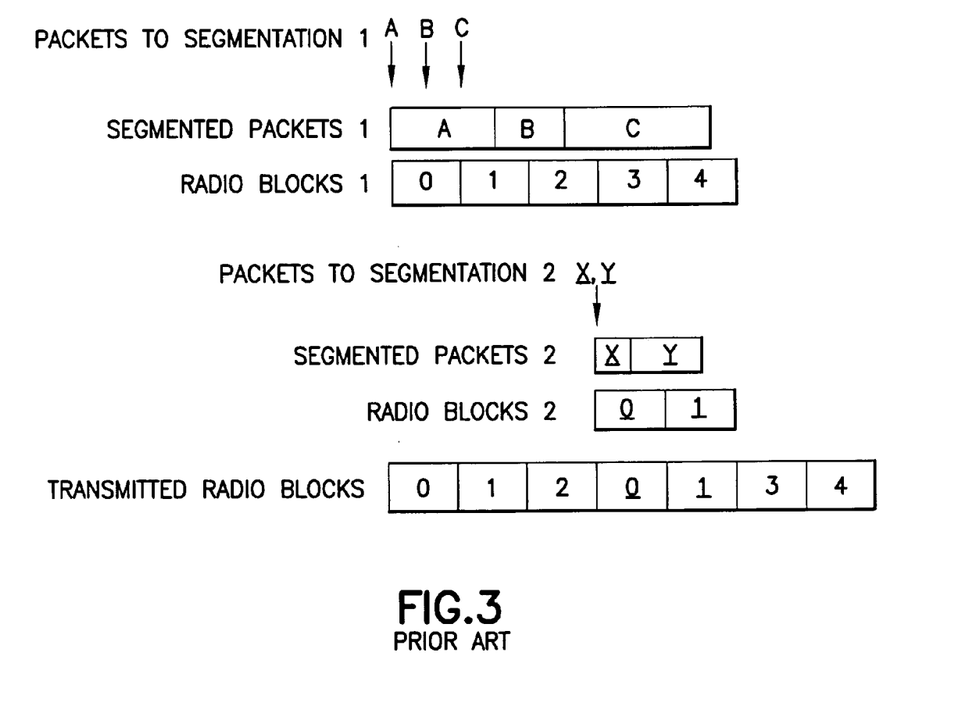
FIG. 3 is a diagram that is useful for explaining a conventional MAC layer multiplexing approach to multiplex packets from different flows such that each flow has an associated segmentation entity, and where each radio block has data from only one flow.

In another approach, which can be referred to as a Media Access Control (MAC) layer multiplexing technique, different flows have different segmentation entities, and each radio block contains packet data from only one flow. In this method each radio block carries a Flow Identity. This method was employed in EGPRS R99 to multiplex between different users, and it has been proposed for use in EGPRS Release 2000 (R00) to multiplex between different flows. Referring to FIG. 3, it can be readily seen that this technique leads to inefficiencies, as some of the radio blocks are not completely filled (blocks 4 and 1.) However, the transmission of the higher priority packets X and Y can begin immediately in radio blocks 0 and 1.

A further technique, referred to as RLC multiplexing below segmentation, is similar to the last, except that it operates above the Automatic Repeat reQuest (ARQ) protocol level. As such, the Flow Identity can be transmitted as user data and need be included only when the flow changes. A drawback to this technique is that any ARQ retransmissions must have a higher priority than the original transmissions of a higher priority flow, since a single ARQ protocol is used and protocol stalling is to be avoided. With special care, however, a different prioritization is possible.

OBJECTS AND ADVANTAGES OF THE INVENTION

It is a first object and advantage of this invention to provide an improved radio channel packet data transmission system and method.

It is another object and advantage of this invention to provide a technique that permits efficient multiplexing of packet data between flows when using a single radio channel or TBF.

SUMMARY OF THE INVENTION

The foregoing and other problems are overcome and the foregoing objects and advantages are realized by methods and apparatus in accordance with embodiments of this invention.

A method is disclosed for multiplexing a plurality of data flows onto a radio channel, as is a wireless communication system that operates in accordance with the method. The method includes steps of (a) segmenting data packets of a first data flow into radio blocks and transmitting the radio blocks in the radio channel from a transmitter to a receiver; (b) in response to a required transmission of data packets of a second data flow, signaling in a first field a change in data flows; (c) signaling in a second field an identity of the second data flow; and (d) segmenting data packets of the second data flow into radio blocks and transmitting the radio blocks of the second data flow until there is no longer a need to send or transmit data packets of the second data flow, or until a change is required to a third data flow.

In the preferred embodiment of these teachings the first field is a Length Indicator field, having a special value, that is inserted into a list of Length Indicators at a position after any Length Indicators specifying lengths of segments of the first data flow, and before any Length Indicators specifying lengths of segments of the second data flow. Also in the preferred embodiment, the second field is a Flow Identifier field.

The method further includes steps of (e) changing back to transmitting the first data flow; and (f) continuing the transmission of an incompletely transmitted packet of the first data flow.

In response to a detection of an error in a received radio block, the method employs an ARQ technique that transmits a request for retransmission from the receiver to the transmitter which then subsequently retransmits the radio block. In this case a radio block that is received without error after the radio block received with error is not desegmented until after the retransmission of the radio block and the reception of same without error.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 4:
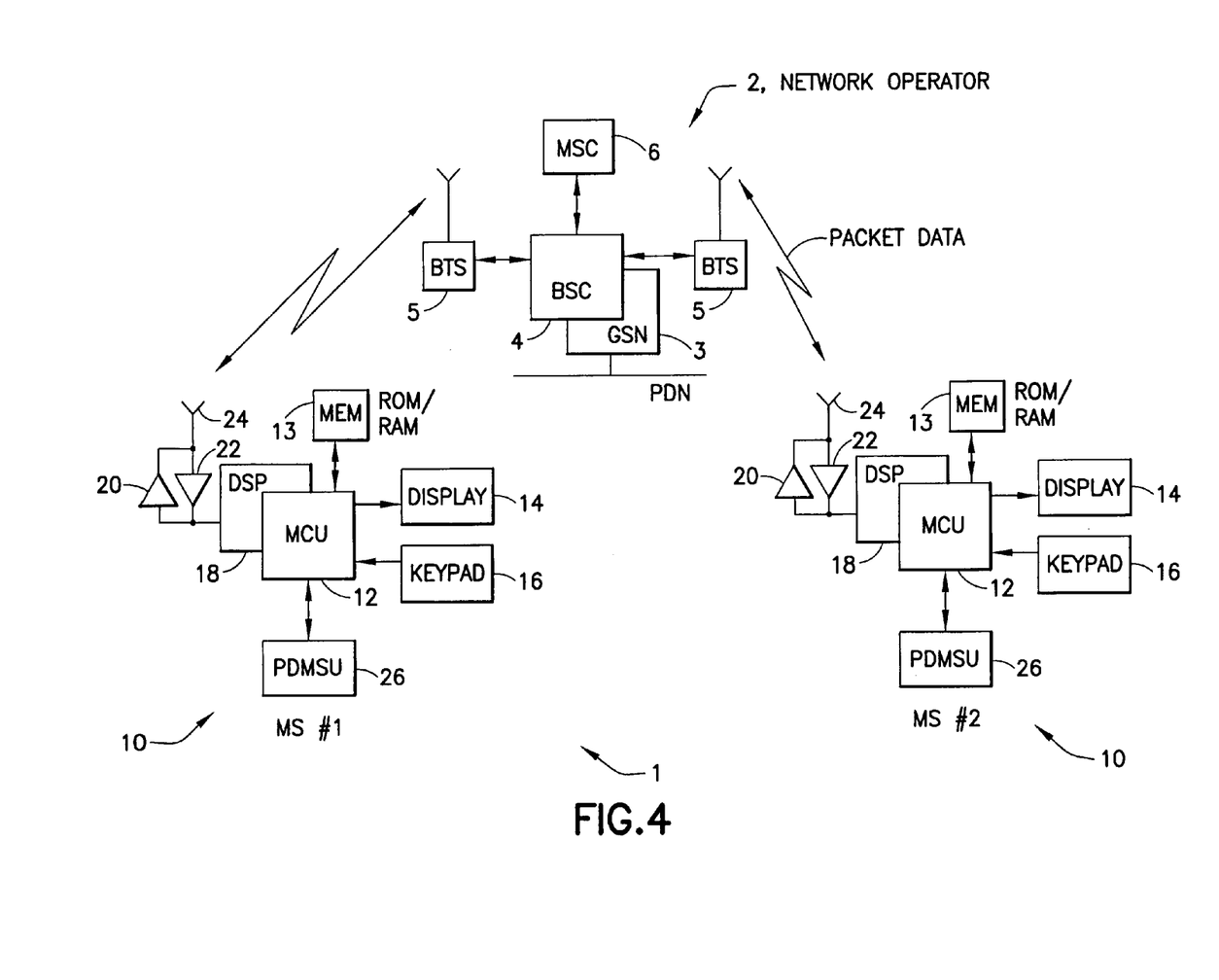
FIG. 4 is a block diagram of a wireless communication system having packet data capability, and which is suitable for practicing the teachings of this invention.

Referring first to FIG. 4, there is illustrated a simplified block diagram of an embodiment of a wireless communications system 1 that is suitable for practicing this invention and that includes a plurality of mobile stations 10. Two mobile stations (MSs) are shown in FIG. 4 for convenience, with one being designated MS#1 and the other MS#2. FIG. 4 also shows an exemplary network operator having, for example, a GPRS Support Node (GSN) 3 for connecting to a telecommunications network, such as the Public Packet Data Network or PDN, at least one base station controller (BSC) 4, and a plurality of base transceiver stations (BTS) 5 that transmit in a forward or downlink direction both physical and logical channels to the mobile stations 10 in accordance with a predetermined air interface standard. A reverse or uplink communication path also exists from the mobile station 10 to the network operator, which conveys mobile originated access requests and traffic, including packet data traffic.

In a preferred, but not limiting, embodiment of these teachings, the air interface standard can conform to any standard that enables packet data transmissions to occur with the mobile stations 10, such as Internet access and web page downloads. In the presently preferred embodiment of this invention the air interface standard is a Time Division Multiple Access (TDMA) air interface that supports the enhanced GPRS capabilities disclosed herein.

The network operator may also include a Message Service Center (MSC) 6 that receives and forwards messages for the mobile stations 10, although any wireless messaging technique that is capable of using packet data can be used. Other types of messaging service may include Supplementary Data Services and one currently under development and known as Multimedia Messaging Service (MMS), wherein image messages, video messages, audio messages, text messages, executables and the like, and combinations thereof, can be transferred between a network and a mobile station.

The mobile station 10 typically includes a microcontrol unit (MCU) 12 having an output coupled to an input of a display 14 and an input coupled to an output of a keyboard or keypad 16. The mobile station 10 may be considered to be a handheld radiotelephone, such as a cellular telephone or a personal communicator. The mobile station 10 could also be contained within a card or module that is connected during use to another device. For example, the mobile station 10 could be contained within a PCMCIA or similar type of card or module that is installed during use within a portable data processor, such as a laptop or notebook computer, or even a computer that is wearable by the user.

The MCU 12 is assumed to include or be coupled to some type of a memory 13, including a read-only memory (ROM) for storing an operating program, as well as a random access memory (RAM) for temporarily storing required data, scratchpad memory, received packet data, packet data to be transmitted, and the like. A separate, removable SIM (not shown) can be provided as well, the SIM storing, for example, a preferred Public Land Mobile Network (PLMN) list and other subscriber-related information. The ROM is assumed, for the purposes of this invention, to store a program enabling the MCU 12 to execute the software routines, layers and protocols required to implement the transmission and reception of packet data in accordance with the teachings herein, as may as well provide a suitable user interface (UI), via display 14 and keypad 16, with a user. Although not shown, a microphone and speaker are typically provided for enabling the user to conduct voice calls in a conventional manner.

The mobile station 10 also contains a wireless section that includes a digital signal processor (DSP) 18, or equivalent high speed processor, as well as a wireless transceiver comprised of a transmitter 20 and a receiver 22, both of which are coupled to an antenna 24 for communication with the network operator. Packet data is transmitted and received through the antenna 24, in accordance with the teachings herein.

For the purposes of this description the mobile station 10 is shown to include a packet data multiplexing and segmentation unit (PDMSU) 26 that operates in accordance with these teachings. The PDMSU 26 receives data packets to be transmitted and controls the transmission of these packets in the manner described below with reference to FIGS. 5, 6 and 7. The PDMSU 26 is also assumed to include a corresponding demultiplexing and desegmentation capability for packet data received from a radio channel. In a typical embodiment the PDMSU 26 can be implemented by program instructions stored within the memory 13, and which are executable by the MCU 12.

In a presently preferred, but not limiting, embodiment of these teachings the mobile station 10 operates in accordance with a protocol hierarchy (from top to bottom) as follows:

PDCP—PDCP provides the packets to be transmitted, with different packet instances for different flows.

Segmentation—Performs segmentation and concatenation of packets into radio blocks and, in EGPRS, is part of the RLC protocol.

ARQ—The ARQ requests and performs retransmissions of incorrectly received radio blocks, including buffering and in-order-delivery of radio blocks. ARQ in EGPRS is part of the RLC protocol, and is not used in an unacknowledged RLC mode.

MAC—The MAC layer performs the function of multiplexing between different users.

Physical—The physical layer or protocol handles radio channel coding and decoding, modulation and demodulation, transmission and reception.

Having thus described a suitable embodiment of a wireless communications network and system for practicing this invention, a description of this invention is now provided.

Figure 5:
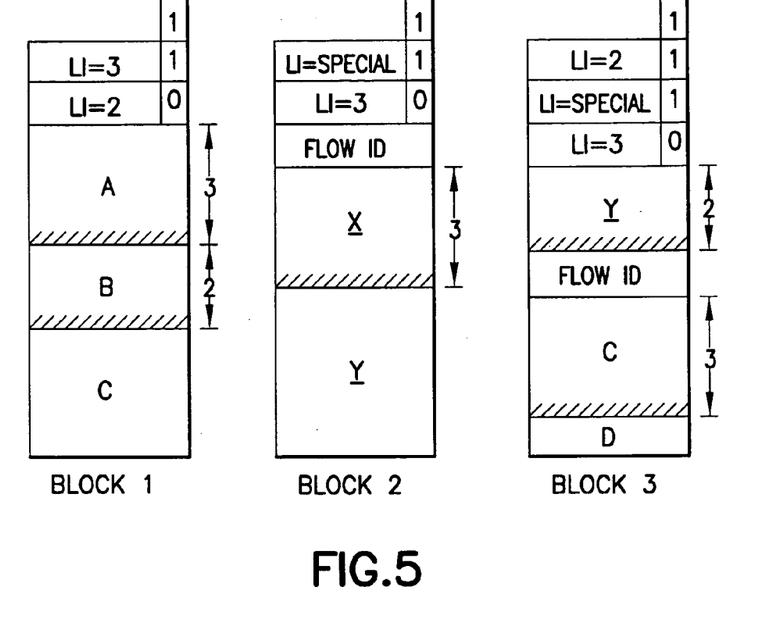
FIG. 5 is a diagram that is useful in explaining a multiplexing and segmentation technique, using Length Indicators, in accordance with these teachings.

Referring to FIG. 5, it is shown how the use of Length Indicator field is extended and enhanced so as to allow efficient multiplexing between data flows from the mobile station 10. In accordance with these teachings a special value of the Length Indicator is specified to indicate a presence of a Flow Identifier. The Flow Identifier is used to signal to the receiver (network or the mobile station) that the data flow has changed, and that all segments following the Flow Identifier are to be interpreted as belonging to the identified flow.

Note that block 1 appears as it does in FIG. 1, i.e., the first block (block 1) contains packets A and B, and the beginning of packet C. The Length Indicators indicate the length of the segments that carry the last octet of the packets (in this case, packets A and B). Since no Length Indicator is provided for packet C, packet C is interpreted in a conventional manner to continue in the next block (block 2). However, in block 2 the first Length Indicator field contains the special value and therefore signals, in accordance with an aspect of the teachings of this invention, a change in the packet data flow. Since the receiver knows from the absence of the LI field in block 1 that packet C is not yet completely received, when the flow change is again signaled in block 3 by the presence of another special value in the Length Indicator field, the remainder of packet C is transmitted and received.

In this example it is assumed that the two higher priority packets X and Y are required to be transmitted during the time that packet C is being transmitted. This is signaled by inserting the special value in the Length Indicator field (LI=special), followed by the Length Indicator (e.g., 3) for the new packet X followed by the Flow Identifier for the new flow. Packet X is then transmitted, followed by the beginning of packet Y. Since packet Y will continue into block C, no Length Indicator is provided for packet Y. Instead, the Length Indicator for packet Y is provided at the beginning of block C, followed by another Length Indicator containing the special value to signal the resumption of the first flow and the remainder of packet C, followed by the Length Indicator for the remainder of packet C (i.e., LI=3 in this case). At the end of packet Y another Flow ID is inserted to again indicate the identification of the first flow, followed by the remainder of packet C, which in turn is shown followed by the start of a packet D that is also associated with the first flow. The transmission of packet D is assumed to continue into a fourth block (not shown), since no LI field is provided in block 3 for packet D.

Although not shown in FIG. 4, a single radio block can contain multiple Flow Identifiers to signal multiple flow changes (e.g., a first flow to a second flow to a third flow and then back to the first or the second flow).

Figure 6:
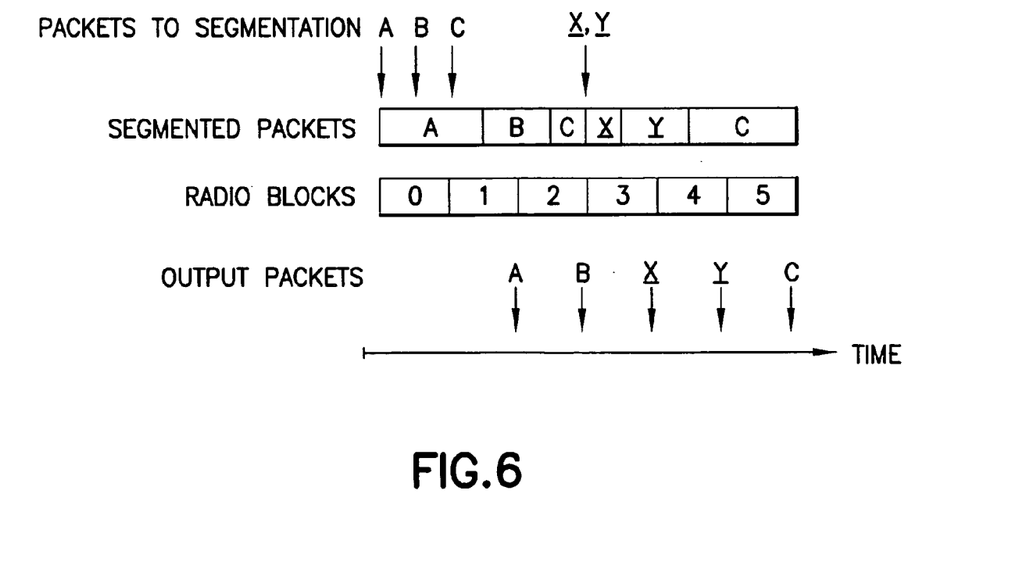
FIG. 6 is a diagram showing an example of the multiplexing and segmentation of two data flows in accordance with these teachings.

FIG. 6 illustrates an example of the operation of the mobile station 10, in particular the PDMSU 26, in accordance with these teachings. Five packets are to be transmitted: three packets (A, B, C) from the first flow and the two (higher priority) packets X and Y from the second flow. The first set of arrows indicate when in time the packets arrive at the PDMSU 26. The packets A, B and C have different sizes, as indicated by the difference in the lengths of their respective rectangles (e.g., A is larger than B, and C is larger that either A or B since two separate segments form the packet C). Packets X and Y may also be of different sizes. In this example the radio blocks are all assumed to be of the same size, although in operation they may be of different sizes as well.

Radio block 2 can be seen to contain the beginning of packet C. However, since the higher priority packet X arrives before the start of radio block 3, the transmission of the remainder of packet C is delayed until radio blocks 4 and 5, and the second flow containing the higher priority packets X and Y is transmitted first. The second, lower set of arrows indicate when the packets are completely received. It should be noted that the packets within each flow are received in order, but that the packets from different flows are not.

Figure 7:
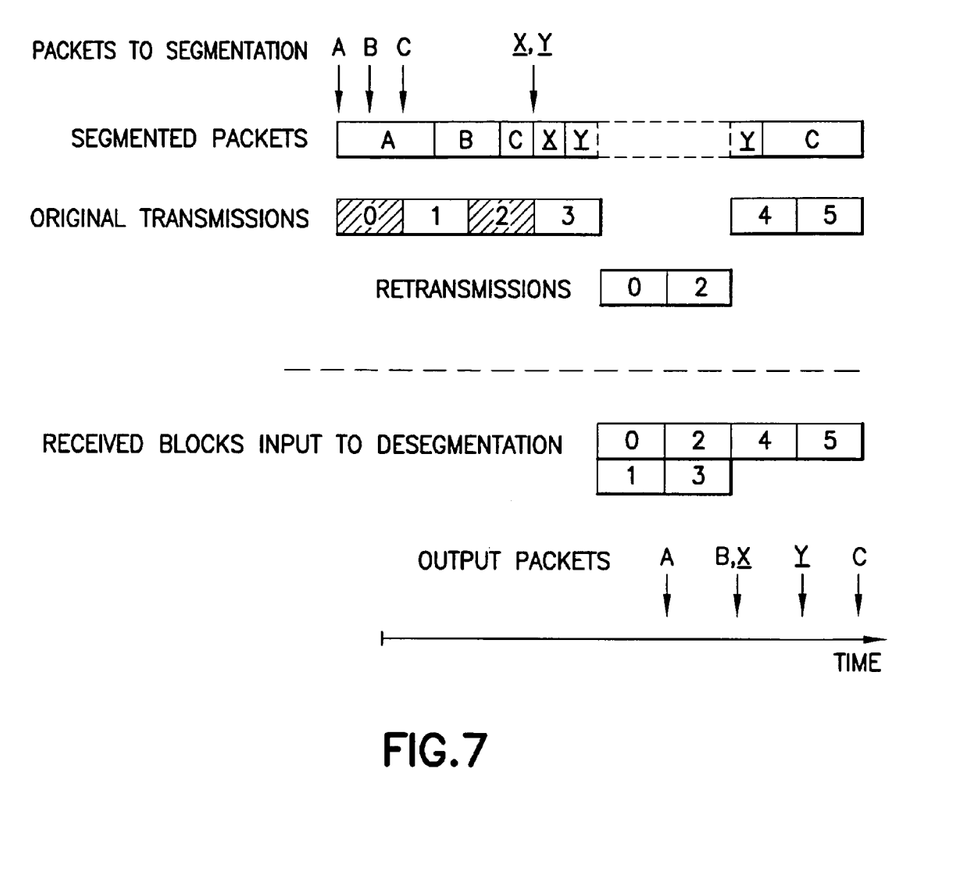
FIG. 7 is a diagram that shows an example of the multiplexing and segmentation of two data flows, as in FIG. 6, as well as the operation of the ARQ protocol.

To avoid problems that may be introduced by transmission errors it is desirable to use this improved packet transmission method with a backward error correction scheme, such as the ARQ protocol. Referring to FIG. 7, a description is now provided of how the teachings of this invention may be implemented in conjunction with a selective-reject-ARQ protocol. The transmitted packets are the same as in FIG. 6, but it is assumed that radio blocks 0 and 2 are first received in error. In this event the receiver signals that a retransmission of blocks 0 and 2 is required. In this case block 1 is not input to the desegmentation unit until the earlier block 0 is correctly received. Similarly, the desegmentation of radio block 3 is delayed until radio block 2 is correctly received. As such, the overall operation of the desegmentation is exactly the same as in the example of FIG. 6.

Alternatively, the ARQ protocol could cooperate with the desegmentation process to enable a faster delivery of packets, but in this case the in-order delivery of packets within a particular flow could not be guaranteed.

The special value assigned to the Length Indicator field to indicate a change in flow can be any value that would not normally be encountered, such as a number greater than a maximum possible packet length, or a negative value.

While the invention has been particularly shown and described with respect to preferred embodiments thereof, it will be understood by those skilled in the art that changes in form and details may be made therein without departing from the scope and spirit of the invention.

What is claimed is:

1. A method comprising: segmenting data packets of a first data flow into radio blocks and transmitting the radio blocks in a radio channel from a transmitter to a receiver; in response to a required transmission of data packets of a second data flow, providing a first field and a second field, signaling in the first field a change in data flows, signaling in the second field an identity of the second data flow, and segmenting data packets of the second data flow into radio blocks and transmitting the radio blocks of the second data flow until there is no longer a need to send data packets of the second data flow, or until a change is required to a third data flow, wherein the first field, when not used to signal a change in the data flows, is used to provide a length of a segment that is completed within a radio block, wherein the first field is not provided in the radio block for the segment if that segment is not completed within the radio block, wherein the second field is provided in the radio block only when the first field indicates a change in data flows, wherein the first field is a length indicator field, wherein the second field is a flow identifier field, wherein the length indicator field has a value that does not correspond to an allowable segment length and that is inserted into the beginning portion of a radio block at a point that indicates where the change from the first data flow to the second data flow is to occur, wherein a further length indicator field is inserted after the length indicator field, the further length indicator field having a value to indicate the length of the packet or portion of a packet that is the first packet of the second data flow, and wherein the flow identifier field is inserted into the radio block just prior to the beginning of the first segment of the first packet of the second data flow.

2. A method as in claim 1, and further comprising steps of: in response to a detection of an error in a received radio block, transmitting a request for retransmission from the receiver to the transmitter; and retransmitting the radio block.

3. A method as in claim 2, wherein a radio block received without error after the radio block received with error is not desegmented until after the retransmission of the radio block and the reception of same without error.

4. A method as in claim 1, and further comprising steps of: changing back to transmitting the first data flow; and continuing the transmission of an incompletely transmitted packet of the first data flow.

5. A method as in claim 1, wherein the second field is placed immediately after the second data flow when the second data flow is completed.

6. A method comprising: segmenting packet data convergence protocol blocks of a first radio bearer into radio link control blocks and transmitting the radio link control blocks in a temporary block flow from a transmitter to a receiver; in response to a required transmission of a packet data convergence protocol block of a second radio bearer, providing a first field and signaling in the first field a change in radio bearers, providing a second field and signaling in the second field an identity of the second radio bearer, and segmenting packet data convergence protocol blocks of the second radio bearer into radio link control blocks and transmitting the radio link control blocks of the second radio bearer until there is no longer a need to send packet data convergence protocol blocks of the second radio bearer, or until a change is required to a third radio bearer, wherein the first field, when not used to signal a change in the radio bearers, is used to provide a length of a segment that is completed within a radio link control block, wherein the first field is not provided in the radio link control block for the segment if that segment is not completed within the radio link control block, wherein the second field is provided in the radio link control block only when the first field indicates a change in radio bearers, wherein the first field is a length indicator field, wherein the second field is a flow identifier field, wherein the length indicator field has a value that does not correspond to an allowable segment length and that is inserted into the beginning portion of a radio link control block at a point that indicates where the change from the first radio bearer to the second radio bearer is to occur, wherein a further length indicator field is inserted after the length indicator field, the further length indicator field having a value to indicate the length of the packet data convergence protocol block or portion of a packet data convergence protocol block that is the first packet data convergence protocol block of the second radio bearer, and wherein the flow identifier field is inserted prior to the beginning of the first segment of the first packet data convergence protocol block of the second radio bearer.

7. A method as in claim 6, and further comprising steps of: in response to a detection of an error in a received radio link control block, transmitting a request for retransmission from the receiver to the transmitter; and retransmitting the radio link control block.

8. A method as in claim 7, wherein a radio link control block received without error after the radio link control block received with error is not desegmented until after the retransmission of the radio link control block and the reception of same without error.

9. A method as in claim 6, and further comprising steps of: changing back to transmitting the first radio bearer; and continuing the transmission of an incompletely transmitted packet data convergence protocol block of the first radio bearer.

10. A method as in claim 6, wherein the second field is placed immediately after the second radio bearer when the packet convergence protocol block of the second radio bearer is completed.

11. A wireless communication system comprising: a transmitter; a receiver; and circuitry in said transmitter for segmenting data packets of a first data flow into radio blocks and for transmitting the radio blocks in the radio channel to the receiver, said circuitry being responsive to a required transmission of data packets of a second data flow for providing a first field and signaling in the first field a change in data flows, for providing a second field and signaling in the second field an identity of the second data flow, and for segmenting data packets of the second data flow into radio blocks and transmitting the radio blocks of the second data flow until there is no longer a need to send data packets of the second data flow, or until a change is required to a third data flow, wherein the first field, when not used to signal a change in the data flows, is used to provide a length of a segment that is completed within a radio block, wherein the first field is not provided in the radio block for the segment if that segment is not completed within the radio block, wherein the second field is provided in the radio block only when the first field indicates a change in data flows, wherein the first field is a length indicator field, wherein the second field is a flow identifier field, wherein the length indicator field has a value that does not correspond to an allowable segment length and that is inserted into the beginning portion of a radio block at a point that indicates where the change from the first data flow to the second data flow is to occur, wherein a further length indicator field is inserted after the length indicator field, the further length indicator field having a value to indicate the length of the packet or portion of a packet that is the first packet of the second data flow, and wherein the flow identifier field is inserted into the radio block just prior to the beginning of the first segment of the first packet of the second data flow.

12. A wireless communication system as in claim 11, wherein the second field is placed immediately after the second data flow when the second data flow is completed.

13. An apparatus comprising: circuitry for segmenting data packets of a first data flow into radio blocks and for transmitting the radio blocks in a radio channel to a receiver, said circuitry being responsive to a required transmission of data packets of a second data flow for providing a first field and signaling in the first field a change in data flows, for providing a second field and signaling in the second field an identity of the second data flow, and for segmenting data packets of the second data flow into radio blocks and transmitting the radio blocks of the second data flow until either an occurrence of a lack of a need to send data packets of the second data flow or an occurrence of a change to a third data flow, wherein the first field, when not used to signal a change in the data flows, is used to provide a length of a segment that is completed within a radio block, wherein the first field is not provided in the radio block for the segment if that segment is not completed within the radio block, wherein the second field is provided in the radio block only when the first field indicates a change in data flows, wherein the first field is a length indicator field, wherein the second field is a flow identifier field, wherein the length indicator field has a value that does not correspond to an allowable segment length and that is inserted into the beginning portion of a radio block at a point that indicates where the change from the first data flow to the second data flow is to occur, wherein a further length indicator field is inserted after the length indicator field, the further length indicator field having a value to indicate the length of the packet or portion of a packet that is the first packet of the second data flow, and wherein the flow identifier field is inserted into the radio block just prior to the beginning of the first segment of the first packet of the second data flow.

14. The apparatus as in claim 13, wherein the second field is placed immediately after the second data flow when the second data flow is completed.

15. A circuit comprising: circuitry for segmenting data packets of a first data flow into radio blocks and for transmitting the radio blocks in a radio channel to a receiver, said circuitry being responsive to a required transmission of data packets of a second data flow for providing a first field and signaling in the first field a change in data flows, for providing a second field and signaling in the second field an identity of the second data flow, and for segmenting data packets of the second data flow into radio blocks and transmitting the radio blocks of the second data flow until either an occurrence of a lack of a need to send data packets of the second data flow or an occurrence of a change to a third data flow, wherein the first field, when not used to signal a change in the data flows, is used to provide a length of a segment that is completed within a radio block, wherein the first field is not provided in the radio block for the segment if that segment is not completed within the radio block, wherein the second field is provided in the radio block only when the first field indicates a change in data flows, wherein the first field is a length indicator field, wherein the second field is a flow identifier field, wherein the length indicator field has a value that does not correspond to an allowable segment length and that is inserted into the beginning portion of a radio block at a point that indicates where the change from the first data flow to the second data flow is to occur, wherein a further length indicator field is inserted after the length indicator field, the further length indicator field having a value to indicate the length of the packet or portion of a packet that is the first packet of the second data flow, and wherein the flow identifier field is inserted into the radio block just prior to the beginning of the first segment of the first packet of the second data flow.

16. A circuit as in claim 15, wherein, in response to a detection of an error in a received radio block, the circuitry is configured to receive a request for retransmission from the receiver to the transmitter; and retransmit the radio block.

17. A circuit as in claim 16, wherein a radio block received without error after the radio block received with error is not desegmented until after the retransmission of the radio block and the reception of same without error.

18. A circuit as in claim 15, wherein the circuitry is configured to change back to transmitting the first data flow and continuing the transmission of an incompletely transmitted packet of the first data flow.

19. The circuit as in claim 15, wherein the second field is placed immediately after the second data flow when the second data flow is completed.

20. An apparatus comprising: circuitry for receiving radio blocks including a first data flow and desegmenting the radio blocks into data packets, said circuitry being further responsive to a reception of radio blocks to identify a first field as indicating a change in data flows and to identify a second field as indicating an identity of a second data flow, and for desegmenting radio blocks into data packets of the second data flow, wherein the radio blocks contain no second field if there is only a first data flow, wherein the first field, when not used to signal a change in the data flows, is used to provide a length of a segment that is completed within a radio block, wherein the first field is not provided in the radio block for the segment if that segment is not completed within the radio block, wherein the second field is provided in the radio block only when the first field indicates a change in data flows, wherein the first field is a length indicator field, wherein the second field is a flow identifier field, wherein the length indicator field has a value that does not correspond to an allowable segment length and that is inserted into the beginning portion of a radio block at a point that indicates where the change from the first data flow to the second data flow is to occur, wherein a further length indicator field is inserted after the length indicator field, the further length indicator field having a value to indicate the length of the packet or portion of a packet that is the first packet of the second data flow, and wherein the flow identifier field is inserted into the radio block just prior to the beginning of the first segment of the first packet of the second data flow.

21. The apparatus as in claim 20, wherein, in response to a detection of an error in a received radio block, transmitting a request for retransmission.

22. The apparatus as in claim 20, wherein the second field is placed immediately after the second data flow when the second data flow is completed.

* * * * *